(12) United States Patent
Churchwell et al.

(10) Patent No.: US 10,046,707 B2
(45) Date of Patent: Aug. 14, 2018

(54) DOOR BLOCKER FOR A VEHICLE

(71) Applicant: Ford Global Technologies, LLC, Dearborn, MI (US)

(72) Inventors: Howard Churchwell, Monroe, MI (US); John W. Jensen, Canton, MI (US); Mahmoud Yousef Ghannam, Canton, MI (US); John Vincent Fazio, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/335,630

(22) Filed: Oct. 27, 2016

(65) Prior Publication Data

US 2018/0118117 A1  May 3, 2018

(51) Int. Cl.
    *B60R 19/42*  (2006.01)
    *B60R 3/00*   (2006.01)
    *E05F 7/00*   (2006.01)

(52) U.S. Cl.
    CPC ............ *B60R 3/002* (2013.01); *B60R 19/42* (2013.01); *E05F 7/00* (2013.01)

(58) Field of Classification Search
    CPC ........... B60R 3/02; B60R 3/002; B60R 19/42; B60R 13/04; B60R 19/38
    See application file for complete search history.

(56) References Cited

U.S. PATENT DOCUMENTS

| | | | | |
|---|---|---|---|---|
| 3,718,357 A | * | 2/1973 | Hertzell | B60R 13/04 293/128 |
| 4,217,715 A | * | 8/1980 | Bryan, Jr. | B60R 13/00 293/118 |
| 5,131,703 A | * | 7/1992 | Stirling | B60R 19/02 280/163 |
| 5,358,268 A | * | 10/1994 | Hawkins | B60R 3/02 182/91 |
| 5,601,300 A | * | 2/1997 | Fink | B60R 3/002 280/166 |
| 6,536,790 B1 | * | 3/2003 | Ojanen | B60R 3/002 280/163 |
| 6,955,370 B2 | * | 10/2005 | Fabiano | B60R 3/02 280/163 |
| 7,077,440 B1 | | 7/2006 | Morales et al. | |
| 7,287,771 B2 | * | 10/2007 | Lee | B60R 3/02 280/163 |
| 7,318,596 B2 | * | 1/2008 | Scheuring, III | B60R 3/02 280/163 |
| 8,146,935 B1 | * | 4/2012 | Adams | B60R 3/02 280/164.1 |

(Continued)

FOREIGN PATENT DOCUMENTS

JP   4647805 B2   12/2010

*Primary Examiner* — Katy M Ebner
(74) *Attorney, Agent, or Firm* — Jason Rogers; Price Heneveld LLP

(57) ABSTRACT

A door blocker for a vehicle includes a rotation platform positioned between first and second lateral drive members. The rotation platform is operably coupled to the first and second lateral drive members. An actuator has a first end operably coupled to the rotation platform. A reaction block has a slot that receives a second end of the actuator. The door blocker may be transformable to a power running board.

20 Claims, 10 Drawing Sheets

(56) References Cited

U.S. PATENT DOCUMENTS

| | | | |
|---|---|---|---|
| 8,235,432 B2 * | 8/2012 | Ryan | B60R 19/38 |
| | | | 280/163 |
| 8,262,113 B1 | 9/2012 | Chafey et al. | |
| 9,180,824 B1 * | 11/2015 | Rodriguez | B60R 13/04 |
| 9,308,880 B1 | 4/2016 | Johnson | |
| 2003/0006575 A1 * | 1/2003 | Genis | B60R 3/002 |
| | | | 280/163 |
| 2004/0108678 A1 * | 6/2004 | Berkebile | B60R 3/02 |
| | | | 280/166 |
| 2006/0175791 A1 * | 8/2006 | Kaempe | B60R 3/002 |
| | | | 280/166 |
| 2007/0228748 A1 * | 10/2007 | Ryan | B60R 19/38 |
| | | | 293/118 |
| 2008/0252034 A1 * | 10/2008 | Duncan | B60R 3/002 |
| | | | 280/163 |
| 2009/0184485 A1 * | 7/2009 | Castillo | B60R 3/002 |
| | | | 280/164.1 |
| 2015/0291116 A1 * | 10/2015 | Pi | B60R 13/04 |
| | | | 280/164.1 |
| 2017/0190308 A1 * | 7/2017 | Smith | B60R 19/48 |

* cited by examiner

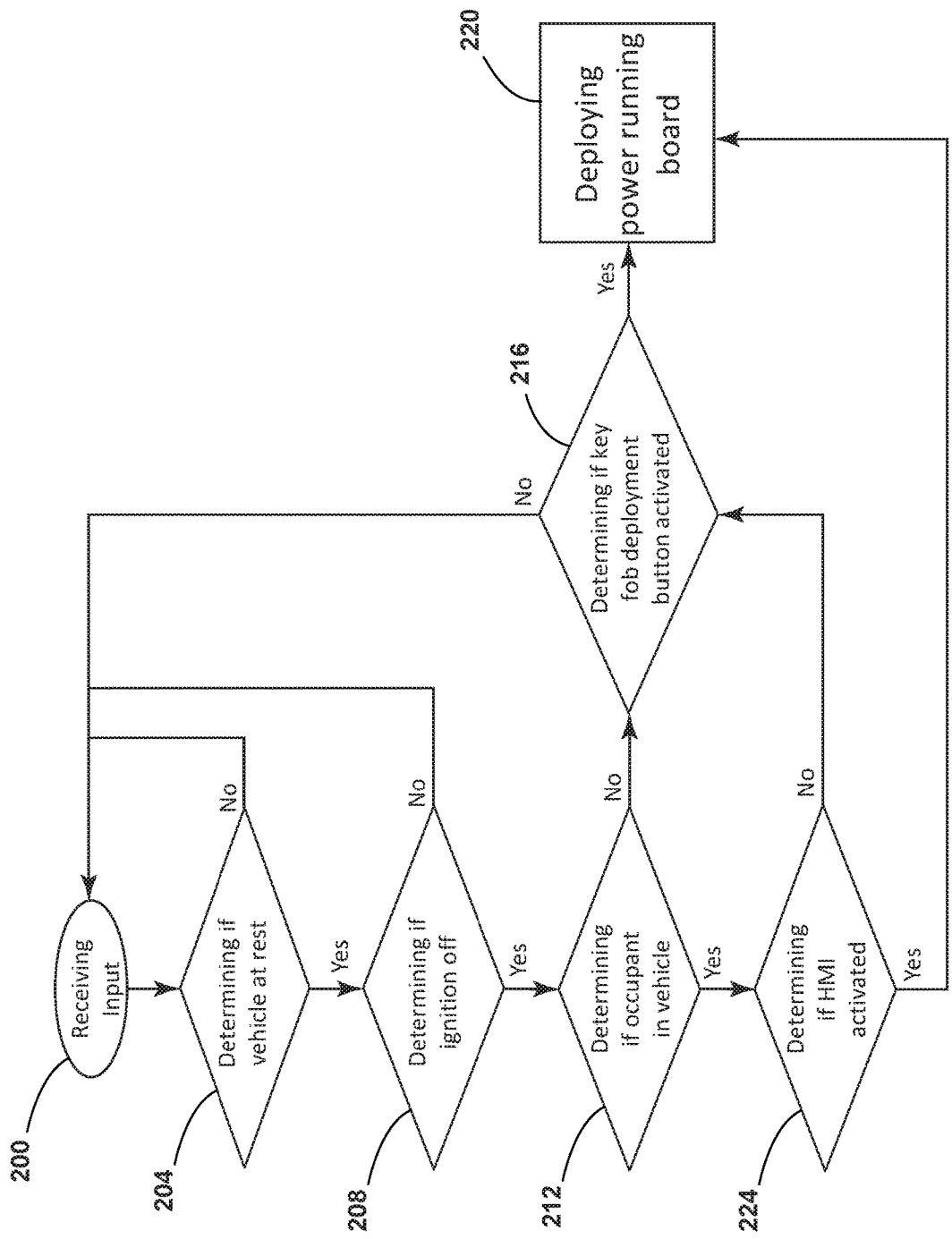

DOOR BLOCKER FOR A VEHICLE

FIELD OF THE DISCLOSURE

The present disclosure generally relates to a door blocker for a vehicle. More specifically, the present disclosure relates to a transformable door blocker for a vehicle.

BACKGROUND OF THE INVENTION

Modern vehicle styling generally has removed the protective bumper that protected the passenger doors of older vehicle models from door dings. In the past, rubber, plastic, or other material door bumpers were often affixed to the outer surface of the passenger doors. Newer styling typically omits such protection, making door dings, scratches, and paint transfers more common. The typical cost of such repairs is often covered solely by the vehicle owner, increasing the cost of ownership and frustration levels of modern vehicle consumers.

SUMMARY OF THE INVENTION

According to one embodiment of the present disclosure, a power running board for a vehicle includes a first lateral drive member and a second lateral drive member. A rotation platform is positioned between the first and second lateral drive members. The rotation platform is operably coupled to the first and second lateral drive members. An actuator has a first end operably coupled within a recess in an underside of the rotation platform. A reaction block has a slot that receives a second end of the actuator. A mount is operably coupled to a support structure. The mount is configured to receive the reaction block in an aperture of the mount. The mount locks the rotation platform in a locked configuration when the rotation platform is in a retracted position.

According to another embodiment of the present disclosure, a door blocker for a vehicle includes a rotation platform positioned between, and operably coupled to, at least one lateral drive member. An actuator has a first end operably coupled to the rotation platform. A reaction block has a slot that receives a second end of the actuator. A mount is operably coupled to a support structure and the reaction block.

According to yet another embodiment of the present disclosure, a door blocker for a vehicle includes a rotation platform positioned between first and second lateral drive members. The rotation platform is operably coupled to the first and second lateral drive members. An actuator has a first end operably coupled to the rotation platform. A reaction block has a slot that receives a second end of the actuator.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 11 is a flow chart of a method of using the transformable door blocker.

DETAILED DESCRIPTION OF THE PREFERRED EMBODIMENT

Figure 1:
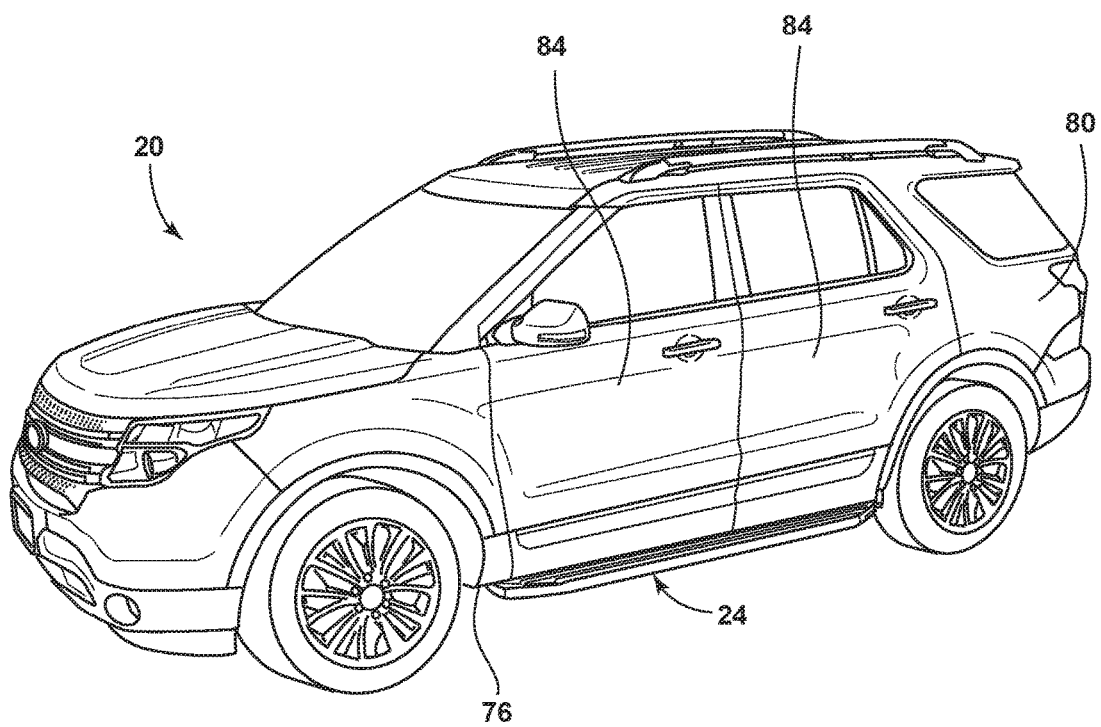
FIG. 1 is a side perspective view of a vehicle having a power running board with a transformable door blocker.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a transformable door blocker. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-11, reference numeral 20 generally designates a vehicle, shown as a wheeled motor vehicle. The vehicle 20 is equipped with a transformable door blocker, such as a power running board 24 in the embodiment shown. The power running board 24 includes a hinge assembly 26. The hinge assembly 26 includes a first lateral drive member 28 and a second lateral drive member 32. The hinge assembly 26 further includes a rotation platform 36 positioned between, and operably coupled to, the first and second lateral drive members 28, 32. The power running board 24 also includes an actuator 40 having a first end 44 operably coupled to a recess 48 in an underside of the rotation platform 36. A reaction block 52 includes a slot 56 that receives a second end 60 of the actuator 40. A mount 64 is operably coupled to a support structure 68 and is configured to receive the reaction block 52 in an aperture 72 of the mount 64. The mount 64 locks the rotation platform 36 in a locked configuration when the rotation platform 36 is in a retracted position.

Referring now to FIG. 1, the vehicle 20 is shown with the power running board 24 operably coupled to an underside 76 of the vehicle 20. The side 80 of the vehicle 20 includes at least one passenger door 84 and is shown having two passenger doors 84 on each side 80 of the vehicle 20. The power running board 24 is shown in a first position. The first position can be used, for example, as a conventional side step for the vehicle 20. The power running board 24 runs longitudinally along the side 80 of the vehicle 20 and extends outward and below the passenger doors 84. The power running board 24 is positioned below at least one of the passenger doors 84. The length of the power running board 24 can be less than, equal to, or greater than the width of at least one of the passenger doors 84.

Figure 2:
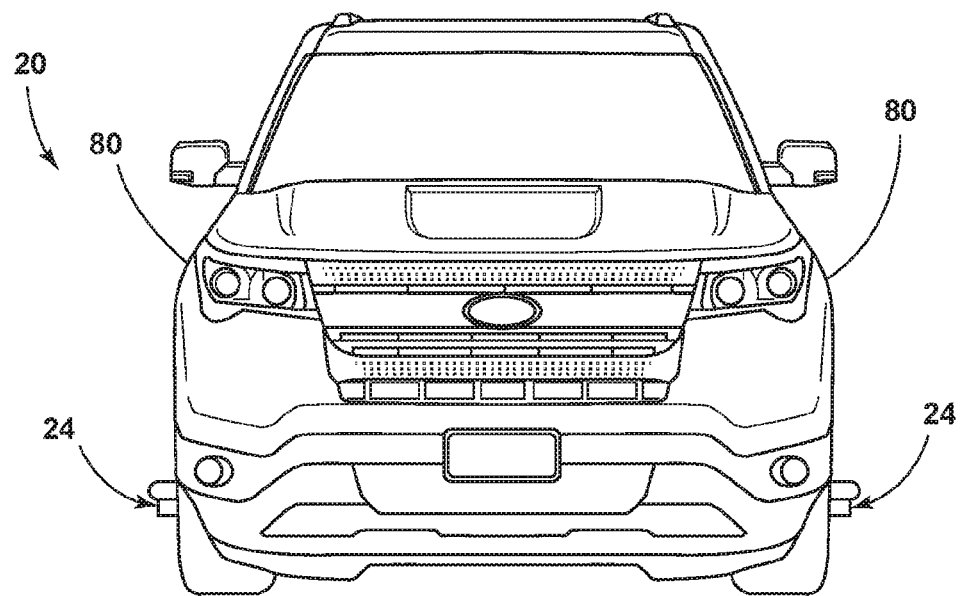
FIG. 2 is a front view of the vehicle with the running board in a first position.

Referring to FIG. 2, the vehicle 20 is shown with the door blocker or power running board 24 in the first position. The first position of the power running board 24 is shown in a generally horizontal orientation, which can be used as a conventional side step for the vehicle 20. While the power running board 24 is shown as extending beyond the side 80 of the vehicle 20, the power running board 24 can alternatively fully retract underneath the vehicle 20 such that the power running board 24 does not extend beyond the side 80 of the vehicle 20. Alternatively, the power running board 24 can retract to a position where an exposed side of the power running board 24 resembles a piece of trim on the exterior of the vehicle 20, thereby providing a seamless or imperceptible stowed position.

Figure 3:
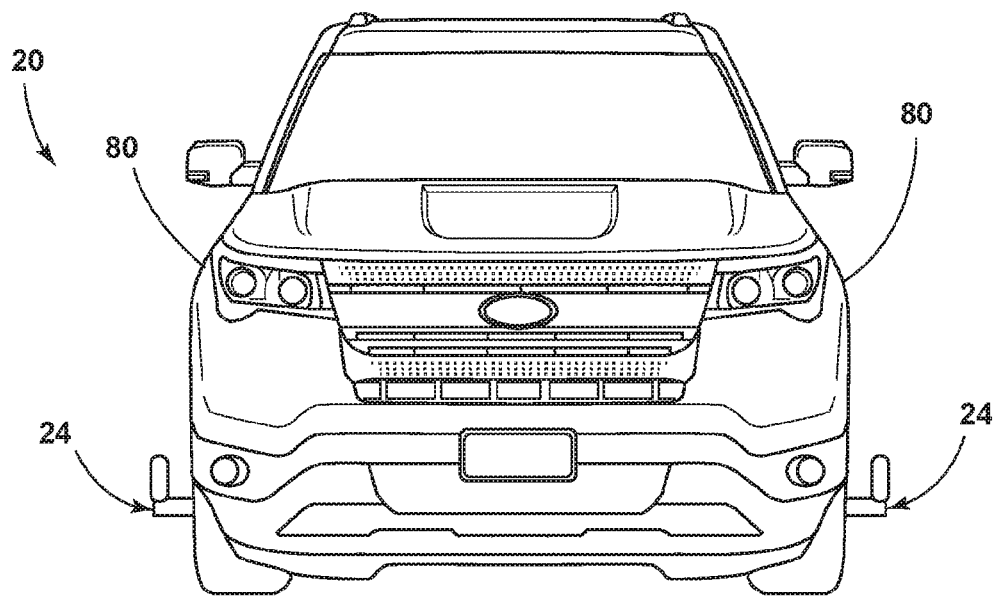
FIG. 3 is a front view of the vehicle, similar to FIG. 2, with the running board in a second position.

Referring now to FIG. 3, the vehicle 20 is shown with the power running board 24 in a second position. The second position can be a deployed configuration of the power running board 24 in a generally vertical orientation. The deployed configuration of the power running board 24 is configured such that the power running board 24 extends upward to prevent door dings, scratches, paint transfers, and other common parking lot hazards to the sides or passenger doors of the vehicle 20. These parking lot hazards can be presented by neighboring parked vehicles, stray shopping carts, careless maneuvering of shopping carts, strollers, and the like. The deployed configuration of the power running board 24 can provide the power running board 24 at a height above the ground that is greater than the height of the power running board 24 above the ground when the power running board 24 is in the locked configuration. For example, the deployed configuration of the power running board 24 can provide the power running board 24 at height on the vehicle 20 that at least partially overlaps with at least one of the passengers doors 84 (FIG. 1). While shown with both power running boards 24 on either side 80 of the vehicle 20 in the deployed configuration, one of skill in the art will recognize that the power running boards 24 can be alternatively deployed such that one of the power running boards 24 is in the deployed configuration and the other of the power running boards 24 can alternatively be in the retracted position, the stowed position, or an extended step position.

Figure 4:
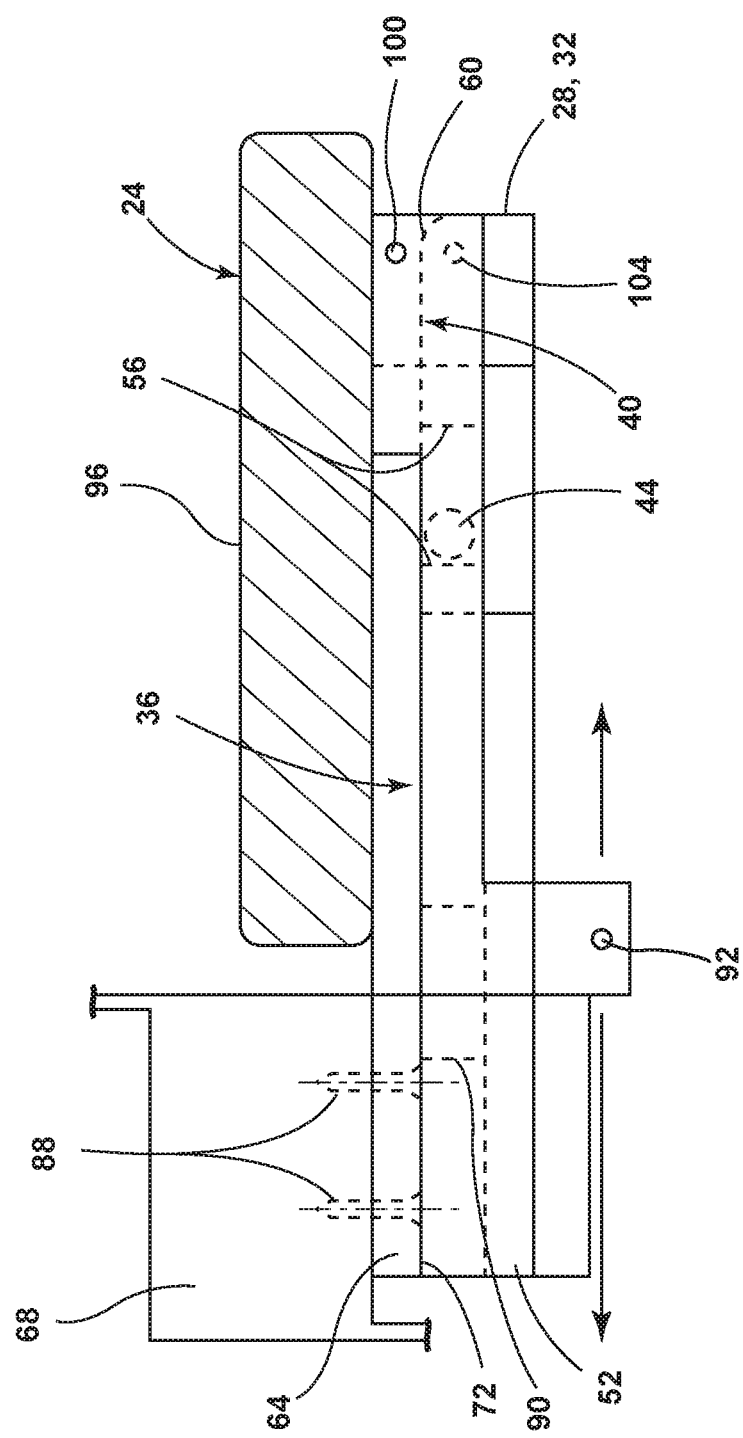
FIG. 4 is a side view of one embodiment of the transformable door blocker in the first position.

Referring to FIG. 4, the power running board 24 is operably coupled to the support structure 68 by at least one fastener 88 that operably couples the mount 64 to the support structure 68. Suitable fasteners 88 include, but are not limited to, screws, bolts, rivets, welding, nails, and the like. Alternatively, the mount 64 can be integrally formed in the support structure 68. The power running board 24 is movable between the retracted position and an extended position. When in the retracted position, a locking feature 90 of the rotation platform 36 nests within the aperture 72 of the mount 64 between the reaction block 52 and the mount 64, which prevents rotational actuation of the power running board 24 when it is in the locked configuration and/or the retracted position. The first and second lateral drive members 28, 32 can be operably coupled to one another by a load-initiation pin 92. The load-initiation pin 92 operably couples the first and second lateral drive members 28, 32 below an underside of the reaction block 52, such that lateral motion of the load-initiation pin 92 induces lateral motion of the first and second lateral drive members 28, 32. Lateral motion of the load-initiation pin 92 and/or the first and second lateral drive members 28, 32 can be accomplished by a mechanical motor, an electric motor, a hydraulic press, a magnetic solenoid, by manual operation, and the like. While lateral motion of the load-initiation pin 92 induces lateral motion of the first and second lateral drive members 28, 32, rotational motion is not permitted of the load-initiation pin 92 or of the first and second lateral drive members 28, 32. Lateral motion of the first and second lateral drive members 28, 32 is accomplished in a synchronized fashion. The power running board 24 includes a load surface 96 that is operably coupled to an upper side of the rotation platform 36. The rotation platform 36 is operably coupled to the first and second lateral drive members 28, 32 by an applied-torque pin 100. The first end 44 of the actuator 40 is positioned within the slot 56 of the reaction block 52. The second end 60 of the actuator 40 is operably coupled to the rotation platform 36 by an actuator torque pin 104. The slot 56 in the reaction block 52 and the actuator 40 are positioned within the recess 48 (FIG. 7) of the rotation platform 36.

Figure 5:
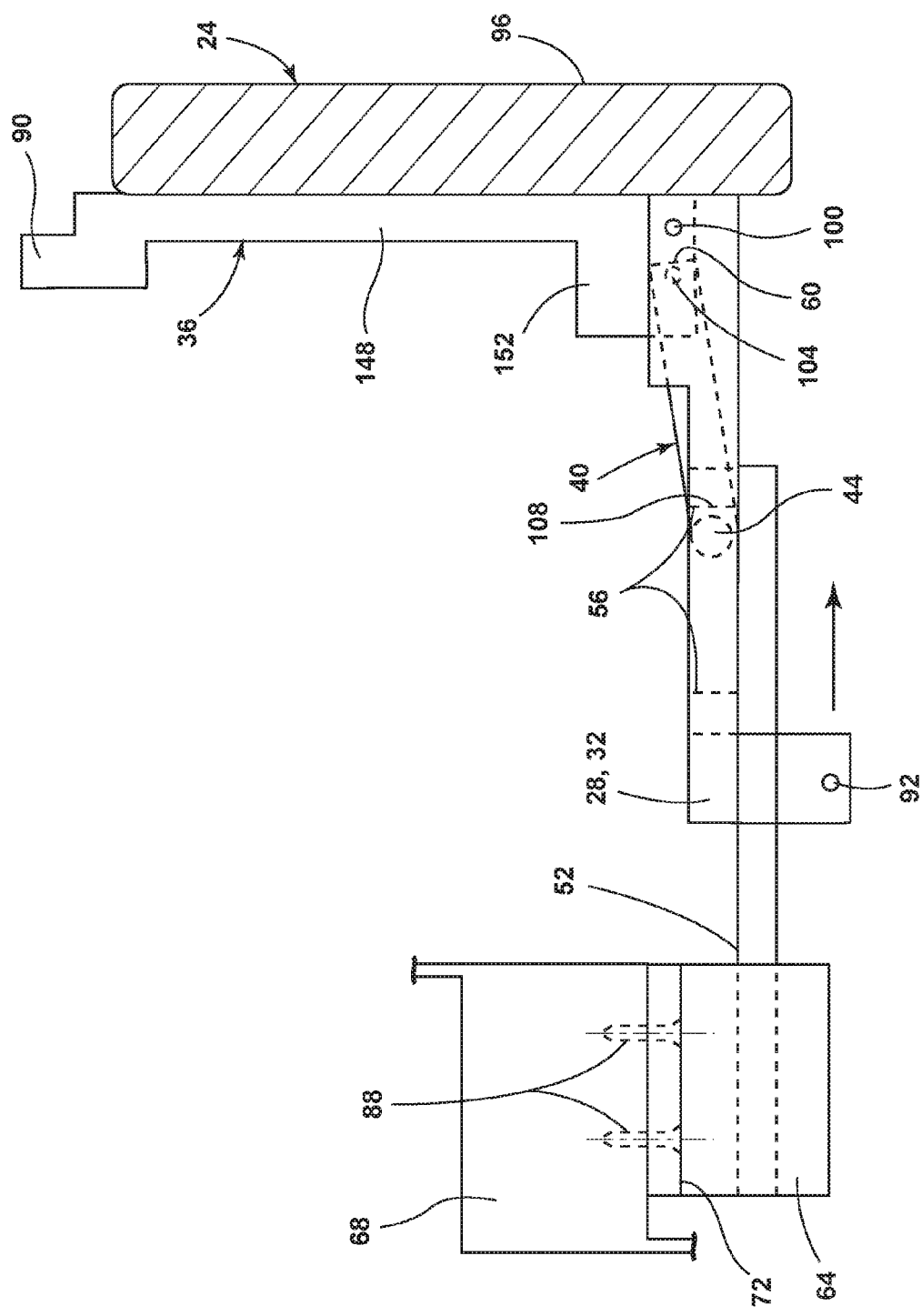
FIG. 5 is a side view of another embodiment of a transformable door blocker, similar to FIG. 4, in the second position.

Referring to FIG. 5, the power running board 24 is operably coupled to the support structure 68 by the at least one fastener 88. More specifically, the at least one fastener 88 operably couples the mount 64 to the support structure 68. The aperture 72 in the mount 64 receives the reaction block 52. The reaction block 52 is fixedly coupled within the aperture 72 of the mount 64. Upon actuation of the first and second lateral drive members 28, 32 from the retracted position to the extended position, the first and second lateral drive members 28, 32 traverse the reaction block 52 in the lateral direction. As the first and second lateral drive members 28, 32 traverse the reaction block 52, the actuator 40 moves laterally within the slot 56 in the reaction block 52. As the actuator 40 reaches a wall 108 of the slot 56 in the reaction block 52, lateral motion of the power running board 24 ceases and a rotational motion of the power running board 24 is induced. The rotational motion of the power running board 24 results from the positioning of the applied-torque pin 100 relative to the actuator torque pin 104. Since the actuator torque pin 104 is positioned below the applied-torque pin 100, as the actuator 40 reaches the end of its lateral travel within the slot 56 of the reaction block 52 (i.e. contacts the wall 108 of the slot 56), the continued lateral motion of the first and second lateral drive members 28, 32 result in the now stationary actuator torque pin 104 becoming a pivot point for the rotation platform 36, which in turn rotates the load surface 96 of the power running board 24 into the deployed configuration to be used as a door blocker. When the power running board 24 is transitioned from the deployed configuration to the locked configuration, the process outlined above is generally reversed. The first and second lateral drive members 28, 32 are actuated in the reverse direction, or inward toward the vehicle 20 (FIG. 1). The actuator 40 then traverses the slot 56 in the reaction block 52 in the reverse direction away from the wall 108. Once the actuator 40 reaches an opposite wall of the slot 56 that is across from, and runs substantially parallel to, the wall 108, then the actuator torque pin 104 once again becomes a pivot point. The rotation platform 36 and the operably coupled load surface 96 then rotate toward the reaction block 52 and can be placed in the locked configuration by continued lateral motion that positions the locking feature 90 within the aperture 72 in the mount 64. Alternatively, the power running board 24 can be rotated toward the reaction block 52 prior to lateral motion toward the vehicle 20.

Figure 6:
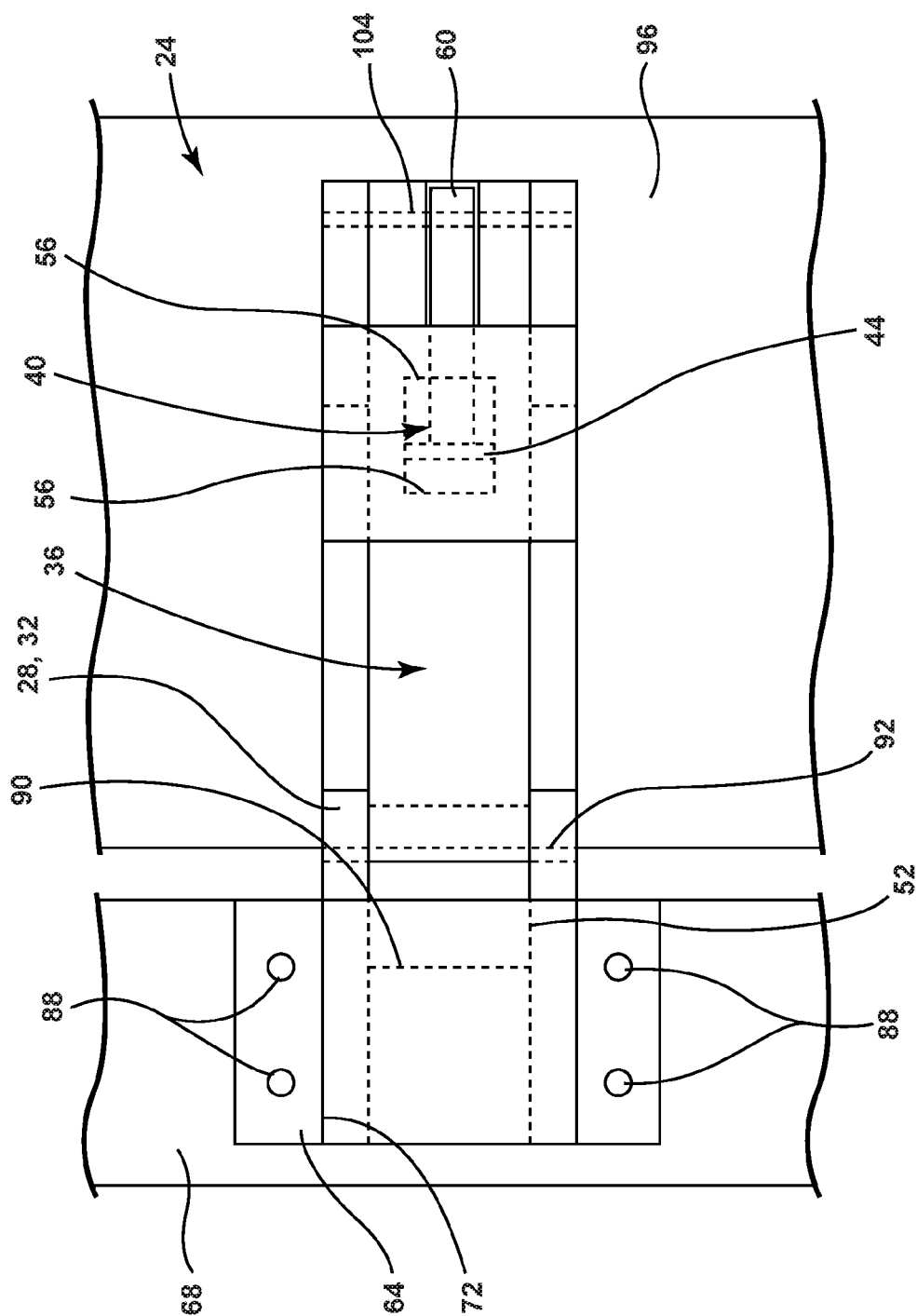
FIG. 6 is a top plan view of the transformable door blocker transitioning between the first and second positions.

Referring to FIG. 6, the at least one fastener 88 operably couples the mount 64 to the support structure 68. The reaction block 52 is operably coupled within the aperture 72 of the mount 64. The locking feature 90 of the rotation platform 36 is configured to be received within the aperture 72 of the mount 64 between the support structure 68, or the mount 64, and the reaction block 52, such that rotational motion of the rotation platform 36 is prevented until the locking feature 90 of the rotation platform 36 has been laterally extended out of the aperture 72 in the mount 64 to no longer be physically impeded from rotational motion by at least one of the support structure 68 and the mount 64. The first and second lateral drive members 28, 32 are positioned on either side of the rotation platform 36. As the first and second lateral drive members 28, 32 move towards the extended position and outboard of the support structure 68, the actuator 40 in turn moves laterally within the slot 56 of the reaction block 52. The actuator 40 can be seen at a mid-point of the transition between the retracted position and the extended position within the slot 56 of the reaction block 52.

Figure 7:
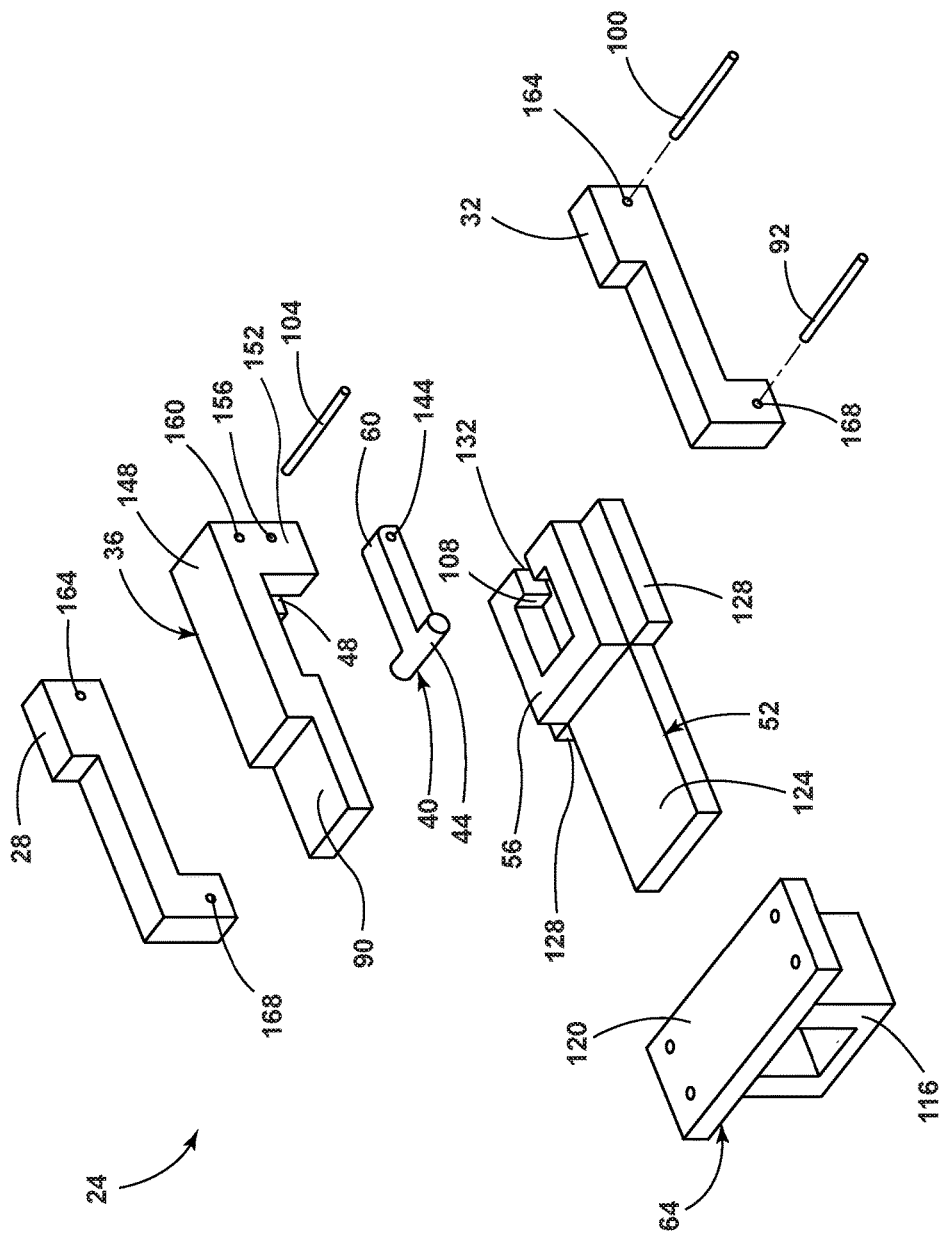
FIG. 7 is an exploded view of a hinge assembly of the transformable door blocker, according to one embodiment.

Referring now to FIG. 7, the mount 64 includes a U-shaped portion 116 and a transverse portion 120. The U-shaped portion 116 of the mount 64 receives a mounting portion 124 of the reaction block 52. The height of the mounting portion 124 of the reaction block 52 is smaller than the height of the slot 56 in the reaction block 52. The reaction block 52 further includes at least one lateral stopping portion 128 that extends from either or both sides of the reaction block 52 and are positioned below the slot 56. The height of the lateral stopping portion 128 of the reaction block 52 is less than the height of the slot 56 and can be equal to the height of the mounting portion 124. The slot 56 is configured to receive the actuator 40. More specifically, the slot 56 includes three continuous walls and one wall provided with an opening 132. The actuator 40 includes the first end 44, which is a first portion, and the second end 60, which is a second portion. The first end 44 of the actuator 40 is coupled to the second end 60 in a transverse fashion. The first end 44 of the actuator 40 is positioned within the slot 56. The width of the first end 44 is sized to fit within the slot 56 but not be able to pass through the opening 132 in the slot 56 wall 108. The second end 60 of the actuator 40 is sized to be able to pass through the opening 132 in the wall 108 of the slot 56. The second end 60 of the actuator 40 includes an actuator aperture 144. The rotation platform 36 includes the locking feature 90, a support portion 148, and a coupling portion 152. The height of the coupling portion 152 can be greater than the height of the support portion 148 and/or the locking feature 90 of the rotation platform 36. The support portion 148 of the rotation platform 36 includes the recess 48 that can receive the slot 56 of the reaction block 52 and/or the actuator 40. The coupling portion 152 of the rotation platform 36 includes an actuator-engaging aperture 156 and a torque aperture 160. The actuator-engaging aperture 156 is positioned below the torque aperture 160.

Referring again to FIG. 7, when assembling the power running board 24, the actuator aperture 144 of the actuator 40 is aligned with the actuator-engaging aperture 156 of the rotation platform 36. Once the actuator 40 is positioned within the recess 48 of the rotation platform 36, then the actuator aperture 144 and the actuator-engaging aperture 156 are aligned. Next, the actuator torque pin 104 is inserted through the actuator-engaging aperture 156 of the rotation platform 36 and passes through the actuator aperture 144 of the actuator 40 and continues through the actuator-engaging aperture 156 on the other side of the rotation platform 36. The first and second lateral drive members 28, 32 each include a torque-engaging aperture 164 and a coupling aperture 168. When assembling the power running board 24, the rotation platform 36 is positioned between the first and second lateral drive members 28, 32 and the torque aperture 160 of the rotation platform 36 is aligned with the torque-engaging apertures 164 of the first and second lateral drive members 28, 32. The applied-torque pin 100 is then inserted through the torque-engaging aperture 164 of one of the first and second lateral drive members 28, 32, the applied-torque pin 100 then passes through the torque aperture 160 of the rotation platform 36, and the applied-torque pin 100 continues into the torque-engaging aperture 164 of the other of the first and second lateral drive members 28, 32. The first and second lateral drive members 28, 32 are operably coupled to one another by the load-initiation pin 92, which passes through the coupling apertures 168 of the first and second lateral drive members 28, 32. The load-initiation pin 92 is positioned below the mounting portion 124 of the reaction block 52 when in an assembled state.

Figure 8:
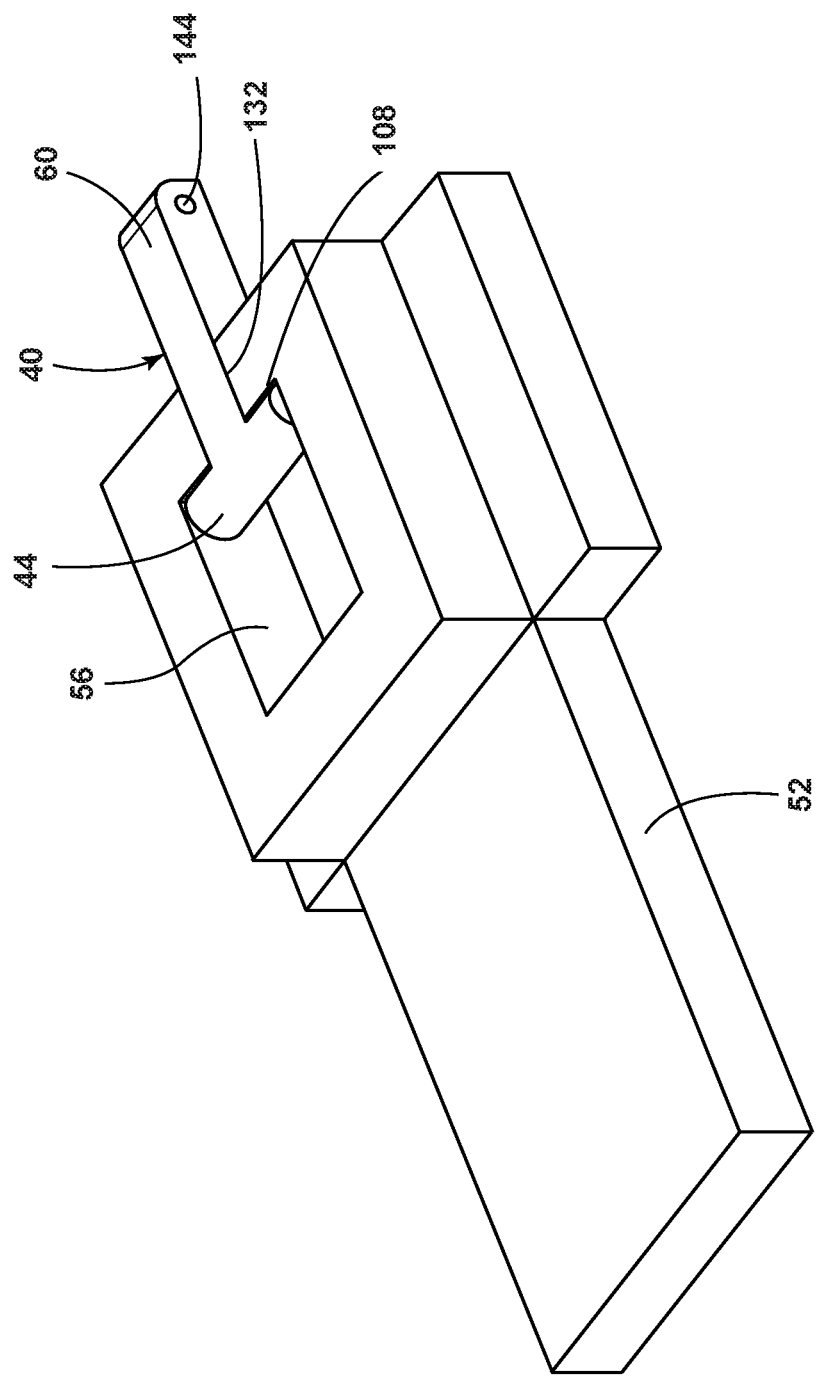
FIG. 8 is an expanded view of a reaction block equipped with an actuator, according to one embodiment.

Referring to FIG. 8, the engagement between the actuator 40 and the slot 56 of the reaction block 52 is shown in further detail. More specifically, the second end 60 of the actuator 40 is configured to pass through the opening 132 in the wall 108 of the slot 56. The first end 44 of the actuator 40 is sized to prevent the first end 44 from being able to pass through the opening 132 in the wall 108 of the slot 56.

Figure 9:
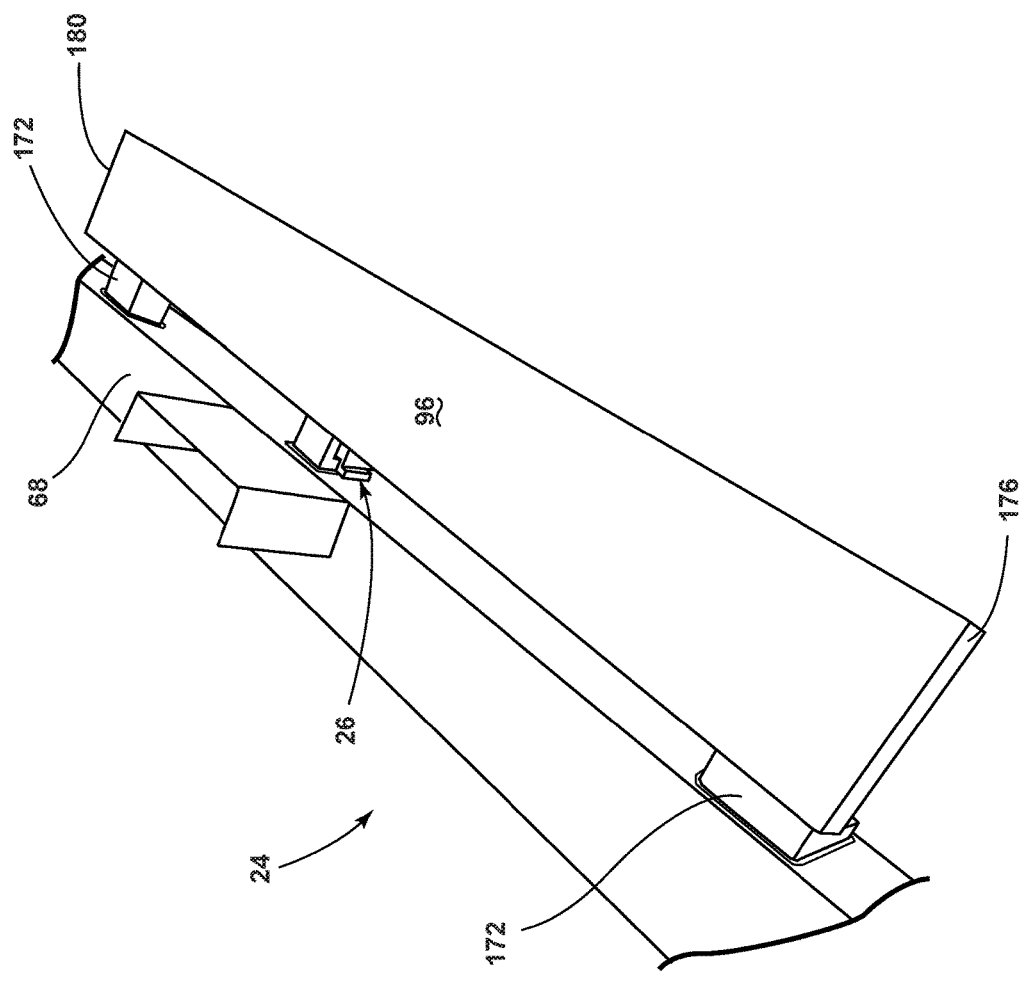
FIG. 9 is a top perspective view of the transformable door blocker in the first position.

Referring now to FIG. 9, the power running board 24 can be supported by at least one load-bearing arm 172 in addition to the hinge assembly 26. For example, the power running board 24 can be supported by two load-bearing arms 172 that are configured to permit the power running board 24 to move between the retracted and extended positions, as well as the locked configuration and the deployed configuration. The depicted embodiment provides the hinge assembly 26 in a central location along the power running board 24 while the load-bearing arms 172 are positioned toward a forward extreme 176 and a rearward extreme 180 of the power running board 24 and/or the load surface 96. The hinge assembly 26 and the load-bearing arms 172 are operably coupled to the support structure 68, such as a rocker panel on the underside of the vehicle 20 (FIG. 1). The hinge assembly 26 and the load-bearing arms 172 can be alternatively arranged without departing from the concepts disclosed herein.

Figure 10:
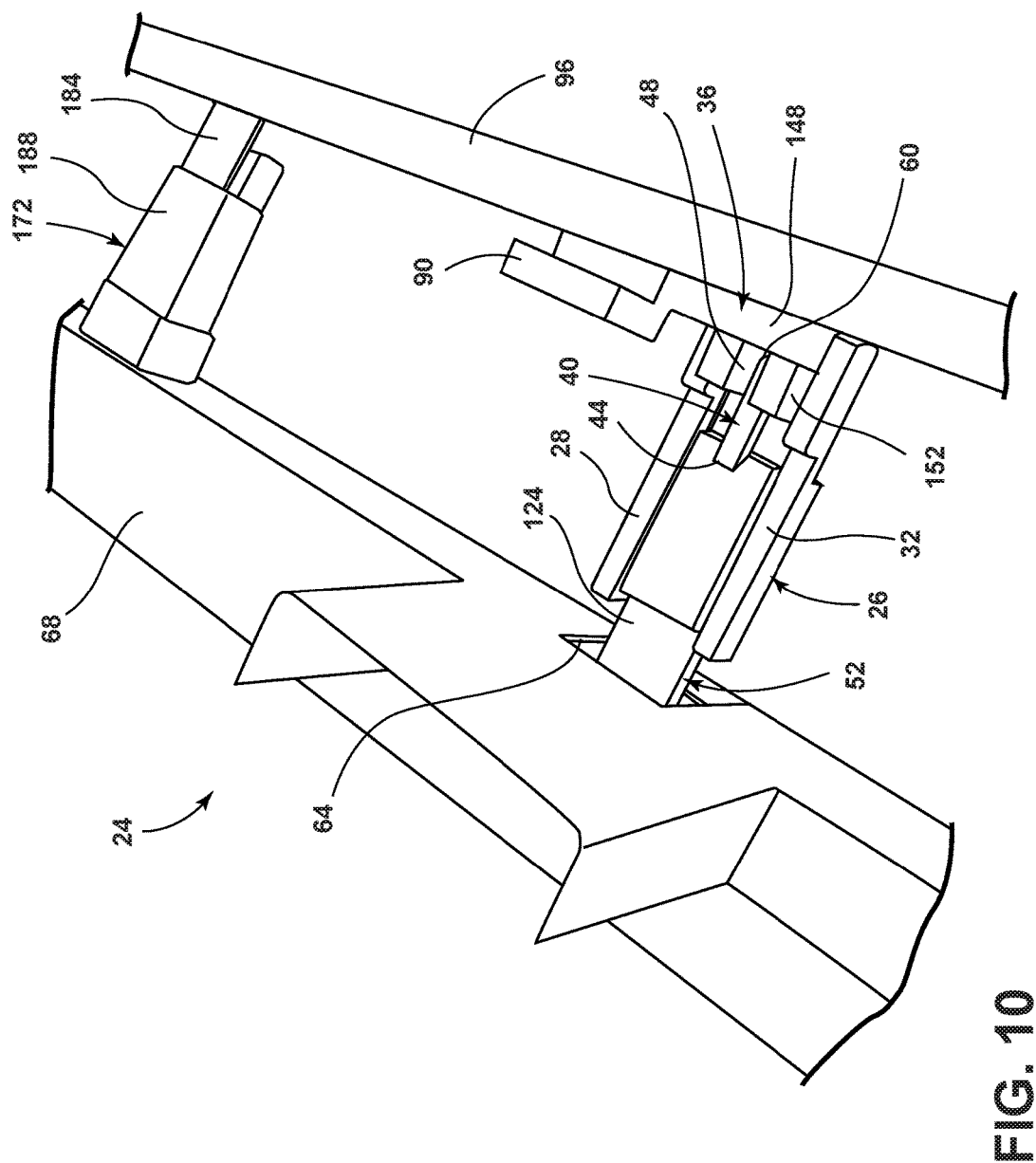
FIG. 10 is a top perspective view of the transformable door blocker in the second position.

Referring to FIG. 10, the power running board 24 is shown in the deployed configuration. The load-bearing arm 172 is equipped with a payout portion 184 and a sleeve portion 188 that permits the power running board 24 to move between the retracted and extended positions, as well as the locked and deployed configurations. The mounting portion 124 of the reaction block 52 is operably coupled to the support structure 68 at the mount 64. The first and second lateral drive members 28, 32 are positioned on either side of the reaction block 52. The first end 44 of the actuator 40 is slidably coupled to the reaction block 52 and hingedly or rotatably coupled to the rotation platform 36 within the recess 48. The locking feature 90 of the rotation platform 36 is disengaged from the mount 64. The support portion 148 of the rotation platform 36 is operably coupled to the load surface 96. The coupling portion 152 of the rotation platform 36 is operably coupled to the second end 60 of the actuator 40.

Referring to FIG. 11, the power running board 24 can be controlled and placed in the locked or deployed configurations automatically in response to user input with a control module. The control module can be a digital controller having a microprocessor and may be a controller dedicated to controlling the power running board 24 or may be a shared controller such as a body control module. For example, the decision to deploy the power running board 24 (FIG. 3) can begin with the step 200 of receiving input from a user to the control module. After receiving the input from the user, the control module can perform the decision step 204 of determining whether the vehicle 20 is at rest. If the vehicle 20 (FIG. 1) is at rest, then the control module can progress to the next decision step 208 of determining if the ignition is off. After a determination that the ignition is off, the control module can determine whether anyone is occupying the vehicle 20 in decision step 212. If there is not anyone occupying the vehicle 20, then the control module determines if a key fob deployment button has been activated in decision step 216. If the key fob deployment button was not activated, then the control module will begin the process in FIG. 11 by returning to step 200. If the key fob deployment button was activated in decision step 216, then the control module will deploy the power running board 24 in step 220. If it was determined in decision step 212 that a person was occupying the vehicle 20, then the control module will determine if a human-machine interface (HMI) was activated from within the vehicle 20 in decision step 224. If the HMI was activated from within the vehicle 20 in decision step 224, then the power running board 24 will be deployed according to step 220. However, if the HMI was not activated from within the vehicle 20 in decision step 224, then the control module will determine if the key fob deployment button was activated, as in decision step 216.

The removal on modern vehicles of the bumper that protected the passenger doors 84 of older vehicle 20 models has resulted in a desire for alternative solutions to protect the passenger doors 84 of vehicles 20 from door dings, paint transfers, scratches, and the like. The concepts disclosed herein provide a deployable solution to protect the passenger doors 84 of vehicles 20 from door dings, paint transfers, scratches, and the like. The disclosed deployable door blocker, or power running board 24, deploys with lateral motion in a vehicle-outboard direction, which induces a vehicle-outboard rotation of the load surface 96 of the power running board 24. By providing rotational motion away from the vehicle 20 during the deployment of the power running board 24, inadvertent contact with the very passenger doors 84 that are to be protected is avoided. Additionally, the sequential use of lateral and rotational motion to deploy the power running board 24 results in the power running board 24 being stowed or locked in a side step configuration in closer proximity to the side 80 of the vehicle 20, which prevents the power running board 24 from becoming a tripping or injury hazard while in the stowed position. Further, the extendable nature of the power running board 24 permits customizable extension points along the travel distance of the power running board 24, such that the power running board 24 can be extended varying distances dependent upon the intended use of the power running board 24. For example, the power running board 24 can be fully retracted underneath the vehicle 20 while in the stowed position. When deployed to a side step position, the power running board 24 can be extended, for example, a distance sufficient to extend beyond the door jamb of an opened passenger door 84 while the load surface 96 remains parallel to the ground. When deployed to a cargo-load position, the power running board 24 can extend beyond the side 80 of the vehicle 20 while the load surface 96 remains parallel to the ground. The cargo-load position provides a side step that improves the ease with which the user balances on the power running board 24 while loading cargo onto a roof of the vehicle 20.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A power running board for a vehicle comprising:
a first lateral drive member;
a second lateral drive member;
a rotation platform positioned between, and operably coupled to, the first and second lateral drive members;
an actuator having a first end operably coupled within a recess in an underside of the rotation platform;
a reaction block having a slot that receives a second end of the actuator, wherein the actuator moves laterally within the slot; and
a mount operably coupled to a support structure and configured to receive the reaction block in an aperture of the mount, wherein the mount locks the rotation platform in a locked configuration when the rotation platform is in a retracted position.

2. The power running board for a vehicle of claim 1, wherein the rotation platform is transitioned between the locked configuration and a deployed configuration by both lateral and rotational movement.

3. The power running board for a vehicle of claim 1, further comprising:
a load surface operably coupled to an upper side of the rotation platform.

4. The power running board for a vehicle of claim 1, wherein the support structure is said vehicle.

5. The power running board for a vehicle of claim 1, further comprising:
a motor operably coupled to the first and second lateral drive members at a load-initiation pin, wherein the load-initiation pin operably couples the first and second lateral drive members together.

6. The power running board for a vehicle of claim 5, wherein the motor is an electric motor.

7. The power running board for a vehicle of claim 5, wherein the motor is a mechanical motor.

8. The power running board for a vehicle of claim 5, wherein the motor is a hydraulic press.

9. The power running board for a vehicle of claim 5, wherein the motor is a magnetic solenoid.

10. A door blocker for a vehicle comprising:
a rotation platform pivotably coupled to at least one lateral drive member;
an actuator having a first end pivotably coupled to the rotation platform;
a reaction block having a slot that receives a second end of the actuator, wherein the actuator is configured to undergo lateral and rotational movement in a sequential manner; and
a mount operably coupled to a support structure and the reaction block, wherein the mount locks the rotation platform in a locked configuration when the rotation platform is in a retracted position.

11. The door blocker for a vehicle of claim 10, wherein the rotation platform is transitioned between a locked configuration and a deployed configuration by the lateral and rotational movement.

12. The door blocker for a vehicle of claim 10, further comprising:
a blocking member operably coupled to an upper side of the rotation platform.

13. The door blocker for a vehicle of claim 10, wherein the support structure is said vehicle.

14. The door blocker for a vehicle of claim 10, further comprising:
a motor operably coupled to the first and second lateral drive members.

15. A door blocker for a vehicle comprising:
a rotation platform positioned between, and operably coupled to, first and second lateral drive members;
an actuator having a first end operably coupled within a recess in an underside of the rotation platform; and
a reaction block having a slot that the actuator moves laterally within until a wall of the slot is contacted, whereupon rotational movement of the rotation platform is induced.

16. The door blocker for a vehicle of claim 15, further comprising:
a motor operably coupled to the first and second lateral drive members.

17. The door blocker for a vehicle of claim 15, wherein the rotation platform is transitioned between a locked configuration and a deployed configuration by both lateral and rotational movement.

18. The door blocker for a vehicle of claim 15, further comprising:
a mount operably coupled to a support structure and the reaction block.

19. The door blocker for a vehicle of claim 15, further comprising:
a blocking member operably coupled to an upper side of the rotation platform.

20. The door blocker for a vehicle of claim 15, wherein the actuator comprises a first portion and a second portion, and wherein the second portion is coupled to the first portion in a transverse fashion.

* * * * *